United States Patent [19]

Rumreich et al.

[11] Patent Number: 5,907,369
[45] Date of Patent: May 25, 1999

[54] TELEVISION SYSTEM FOR DISPLAYING MAIN AND AUXILIARY IMAGES WITH COLOR ERROR CORRECTION PROVISIONS

[75] Inventors: Mark Francis Rumreich; Ronald Thomas Keen, both of Indianapolis, Ind.

[73] Assignee: Thomson Consumer Electronics, Inc., Indianapolis, Ind.

[21] Appl. No.: 08/712,056

[22] Filed: Sep. 10, 1996

[51] Int. Cl.[6] ................................................. H04M 5/45
[52] U.S. Cl. ........................... 348/566; 348/587; 348/599
[58] Field of Search .................................... 348/563, 564, 348/565, 566, 584, 588, 587, 592, 599, 505, 506; H04N 5/445, 5/45, 9/74, 9/76

[56] References Cited

U.S. PATENT DOCUMENTS

| | | | |
|---|---|---|---|
| 4,101,926 | 7/1978 | Dischert et al. | 358/17 |
| 4,109,276 | 8/1978 | Hopkins, Jr. et al. | 358/4 |
| 4,134,128 | 1/1979 | Hurst | 358/22 |
| 4,134,131 | 1/1979 | Hopkins, Jr. | 358/149 |
| 4,558,348 | 12/1985 | Bolger | 348/538 |
| 5,081,522 | 1/1992 | Hiroyuki | 358/22 |
| 5,202,765 | 4/1993 | Lineberry | 358/183 |
| 5,351,089 | 9/1994 | Matsumoto et al. | 348/497 |
| 5,396,296 | 3/1995 | Gallagher | 348/565 |

FOREIGN PATENT DOCUMENTS

| | | | |
|---|---|---|---|
| 0 369 471 A2 | 5/1990 | European Pat. Off. | H04N 9/475 |
| 0 455 138 A2 | 11/1991 | European Pat. Off. | H04N 9/64 |
| 0 555 756 | 8/1993 | European Pat. Off. | H04N 9/64 |
| 02 087 885 | 3/1990 | Japan | H04N 9/68 |

OTHER PUBLICATIONS

The above references were cited in a PCT International Search report with regard to a corresponding application filed there. (PCT/US 97/15887) For the examiner's information, a copy of the PCT Search Report is enclosed herewith. It will be noted that the Search Report also includes a listing of Patent Family Members of the references cited.

*Primary Examiner*—Sherrie Hsia
*Attorney, Agent, or Firm*—Joseph S. Tripoli; Peter M. Emanuel; David T. Shoneman

[57] ABSTRACT

A television system utilizes a common signal processing unit (e.g., a common chrominance demodulator) for processing a combined video signal suitable for coupling to a display device for producing an image having a portion attributable to a main video signal and a portion attributable to an auxiliary video signal. If the common signal processing unit relies upon the color information (e.g., color burst) contained in the main video signal, and the main signal is either non-existent or lacking such color information, then a substitute color information signal will be generated so that the combined video signal may be processed to roduce a color auxiliary image, and a monochrome (or non-existent) main image.

11 Claims, 5 Drawing Sheets

TELEVISION SYSTEM FOR DISPLAYING MAIN AND AUXILIARY IMAGES WITH COLOR ERROR CORRECTION PROVISIONS

FIELD OF THE INVENTION

This invention generally relates to television systems and more particularly to television systems which are capable of producing a video signal for displaying a main image and an auxiliary image.

BACKGROUND OF THE INVENTION

Television signal processing systems are known which produce a video signal which, when displayed by a display device, will produce a picture having a main image with an auxiliary image inserted within (picture-in-picture, or "PIP") or next to (picture out of picture, or "POP") the main image. The two displayed video images are typically associated with video signals derived from different video sources (e.g., one from a first tuner tuned to one station and one from a second tuner tuned to another station or from a video source such as a VCR or laser disk player).

In order to create the above-described PIP or POP effect the auxiliary image video signal generally is decoded (demodulated) into luminance information and color difference information and then re-encoded to match the main picture video signal. This re-encoding is particularly critical in the chrominance channel, where the saturation (level) and tint (phase) of the auxiliary image is modulated by (and therefore dependent on) the burst signal from the main signal in order to maintain the proper saturation and tint when the combined (main and auxiliary) signal is decoded by the main chrominance decoder. A prior art television system 100 including a modulated chrominance PIP system is shown in FIG. 1. A main luma/chroma separator 104 is coupled to a main video source 102 and produces separated main luminance YM and chrominance CM components. The main luminance YM and chrominance CM components are then coupled to an overlay switch 106. An auxiliary luma/chroma separator 110 is coupled to an auxiliary video source 108 and produces separated auxiliary luminance YA and chrominance CA components. The auxiliary chrominance component CA is demodulated using the auxiliary burst reference by chrominance demodulator 112 to form color difference signals R-Y and B-Y. The color difference signals R-Y and B-Y are then processed (e.g., compressed) by a PIP processor 114 and coupled to a chrominance modulator 176. Chrominance modulator 116 re-modulates the difference signals using the main color burst reference to form chrominance component signal CA'. The re-modulated chrominance component signal CA' and the auxiliary luminance signal YA are coupled to the overlay switch 106.

Overlay switch 106 combines the two sets of component video signals YM,CM and YA,CA' into a set of combined component video signals Y,C. The combined chrominance signal C is demodulated using the main burst reference by chrominance demodulator 118 to form combined color difference signals R-Y" and B-Y". The combined color difference signals R-Y" and B-Y", and the combined luminance signal Y is coupled to a matrix processor and driver circuit 120, which responsively produces display driver signals R, G and B to drive display unit 122.

In the above system, chroma demodulator 118 utilizes timing (synchronization) information and color reference (color burst) from the main luminance and chrominance components to process the combined luminance and chrominance signals because the timing and color reference information from the auxiliary luminance and chrominance components are removed during the auxiliary signal processing. Chroma demodulator 118 may include a "color killer" circuit for suppressing chroma artifacts (e.g., "confetti") in monochrome pictures. As such, if the color killer circuit determines that the (main) video signal does not contain a color burst then the circuit will responsively kill all chroma information.

Unfortunately, if the video signal used to produce a main image does not exist or is monochromatic and does not contain color information (or the information is noisy or otherwise unusable) then both the main and auxiliary picture will be displayed as black and white images, even if the auxiliary video signal included color information. For example, the main image video signal may not include a burst signal (e.g., black and white or monochrome signal) or the burst signal may be very small or distorted (e.g., noisy conditions, severe antenna or tuner tilt across the video band). These conditions can cause loss of color to the auxiliary image.

SUMMARY OF THE INVENTION

The present invention recognizes that the problem of loss of color in a PIP image when receiving a monochromatic main image is due to common signal processing circuitry susceptible to disabling a color image component of an auxiliary video signal when the main video signal is, or appears to be, monochromatic.

A controller generates a substitute color image component in response to the detection of a monochromatic main signal. In this manner the invention allows a color PIP or POP image to be displayed in color, even if the main signal is monochromatic, has noisy or attenuated chrominance information, or is not present.

BRIEF DESCRIPION OF THE DRAWING

The invention will be described with reference to the accompanying Drawing, in which.

Like reference designators in the various figures refer to the same or similar elements.

DETAILED DESCRIPIOTN OF THE DRAWING

Figure 1:
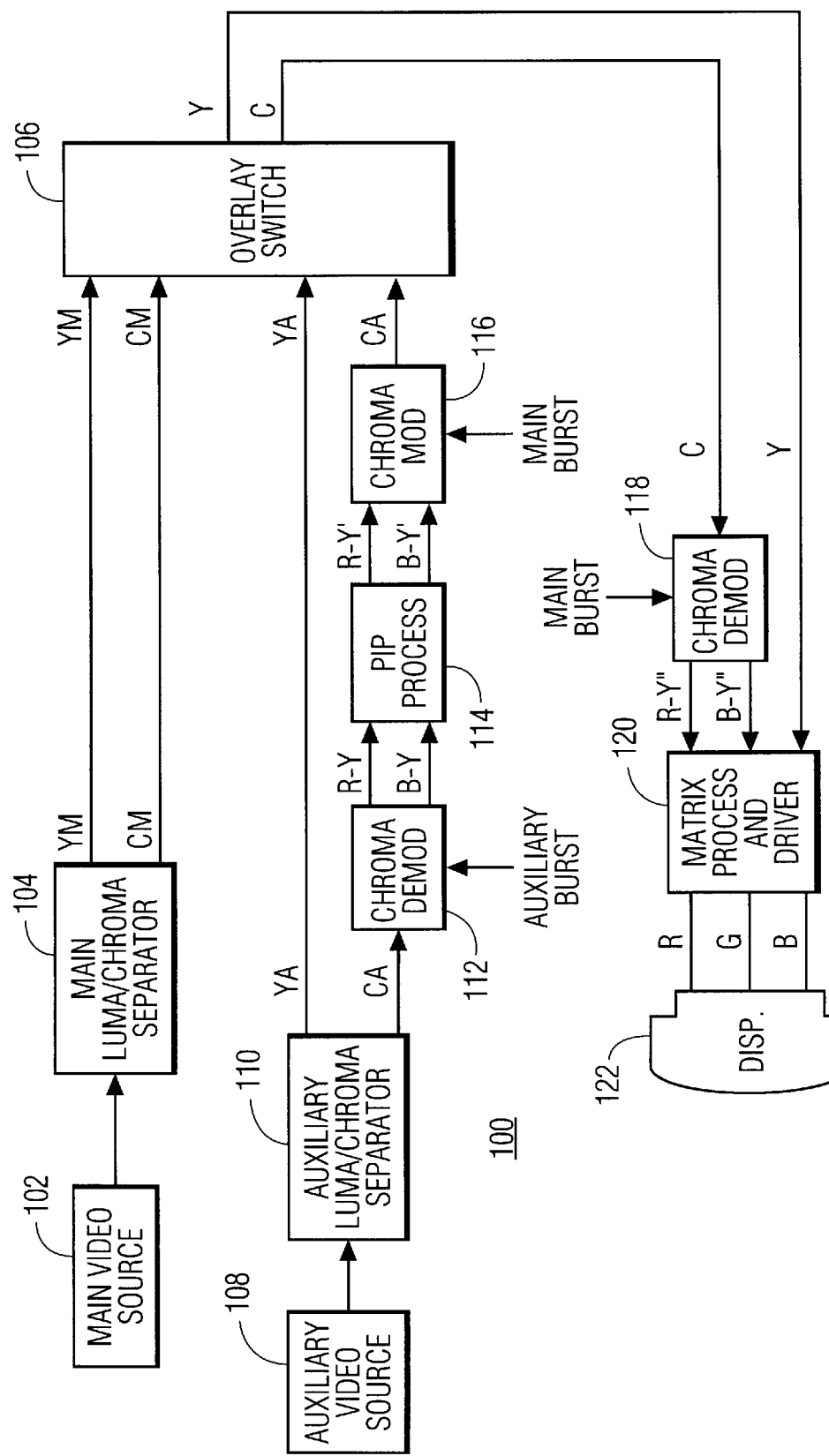
FIG. 1 is a block diagram of a prior art modulated chrominance type picture-in-picture (PIP) television apparratus.
Figure 2:
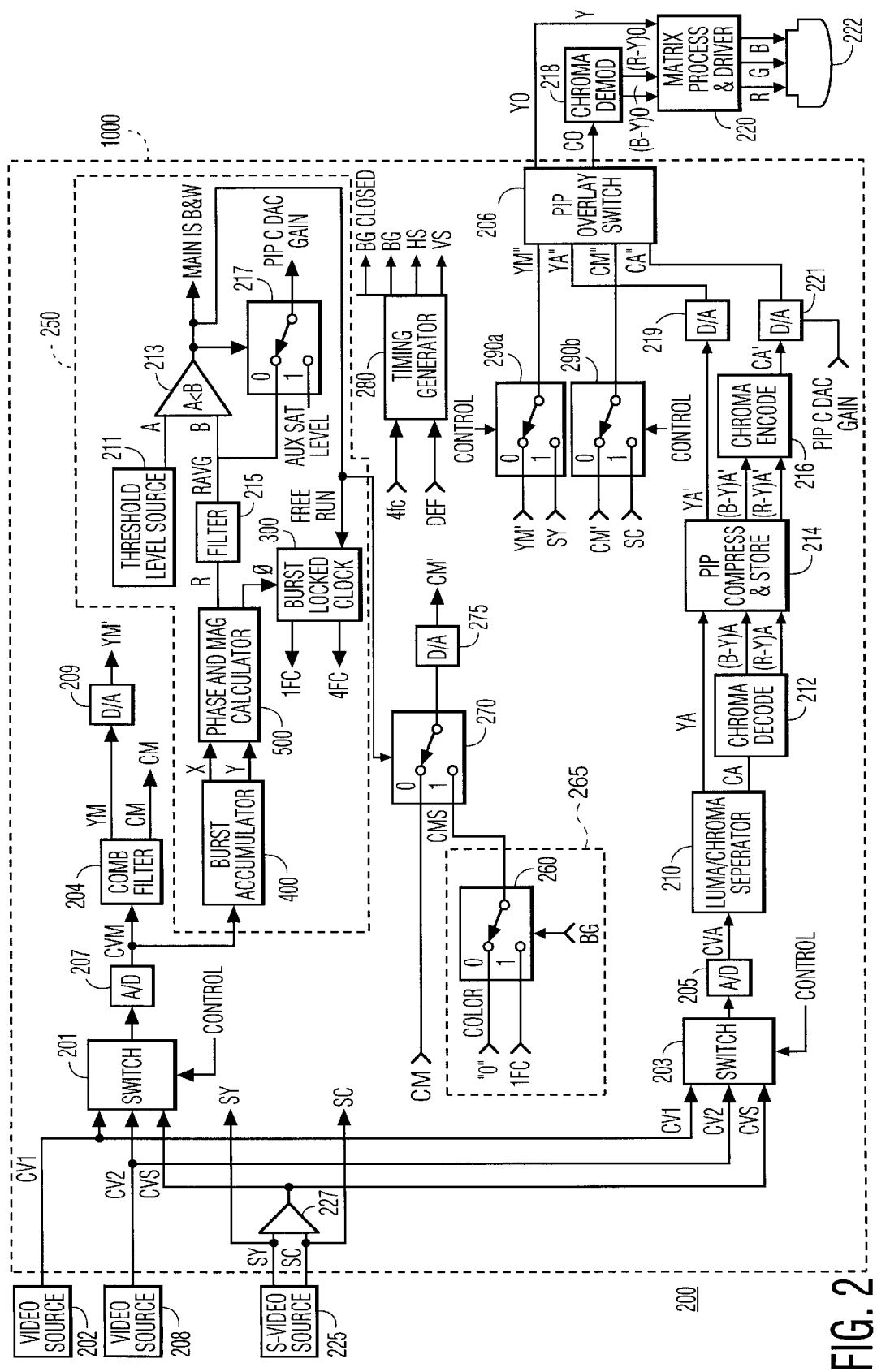
FIG. 2 is a block diagram of a television apparatus embodying the invention.

FIG. 2 illustrates a television apparatus 200 embodying the invention, which includes a first video source 202 for providing a first composite video signal CV1, a second video source 208 for providing a second composite video signal CV2 and an s-video (i.e., high bandwidth) video source 225 for providing an s-video signal having separated luminance SY and chrominance SC components. A video signal processing unit 1000 processes the three video signals to form an output luminance signal YO and an output chrominance signal CO. The output chrominance signal CO is demodulated by chrominance demodulation unit 218. The output of the chrominance demodulation unit 218 and the output luminance signal YO are processed by a matrix processor and driver unit 220 to produce RGB signals to drive a display unit 222.

For television receiver applications first and second video sources 8 and 9 may each include, e.g., a conventional tuner, IF amplifier and detector. The sources may also include baseband video inputs. For television monitor applications the tuner may be omitted. The demodulation unit 218, matrix process and driver unit 220, display unit 222 and the associated control circuitry may be of conventional design, the details of which are largely omitted.

In the exemplary embodiment of FIG. 2, video signal processing unit 1000 is a digital signal processing unit which may be, e.g., a single integrated circuit. Video signal processing unit 1000 includes a main video signal processing channel for producing a main video signal YM",CM", an auxiliary video signal processing channel for producing an auxiliary video signal YA",CA", a switch 206 for selectively merging the main YM",CM" and auxiliary YA",CA" video signals to form the output signal YO,CO. Switch 206 is controlled by a controller (not shown) to form output video signal YO,CO which, when displayed, will produce a picture having a main image with an auxiliary image inserted within (PIP) or next to (POP) the main image. The switch may also, of course, pass only one video signal for display.

Video signal processing unit 1000 includes a summing amplifier 227 which receives the separated luminance SY and chrominance SC components of an s-video signal and responsively produces a third composite video signal CVS. The s-video representative composite video signal CVS and the first CV1 and second CV2 composite video signals are coupled to a main selector switch 201 and an auxiliary selector switch 203. The selector switches are controlled by a controller (not shown).

Video signal processing unit 1000 includes a burst locked clock 300 which is phase locked to the color burst reference signal of the main video signal CVM and produces a first clock signal 1Fc having substantially the same frequency (approx. 3.58 MHz) as the main color burst and a second clock signal 4Fc having a frequency about four times (14.32 MHz) the color burst frequency. These two clock signals are used to synchronize the various elements within video signal processing unit 1000. The burst locked clock has been included in the circuitry of black and white (b&w) detector 250 and will be described in detail later.

Video signal processing unit 1000 includes a timing generator 280 which generates various timing signals used throughout the video signal processing unit. The timing generator 280 is synchronized with the clock signal 4Fc from the burst locked clock 300 and with deflection timing signal DEF from the display driver 300 for generating a number of timing signals including horizontal synchronizing (HS), vertical synchronizing (VS), burst gate (BG) and burst gate closed (BG CLOSED) signals.

Figure 3:
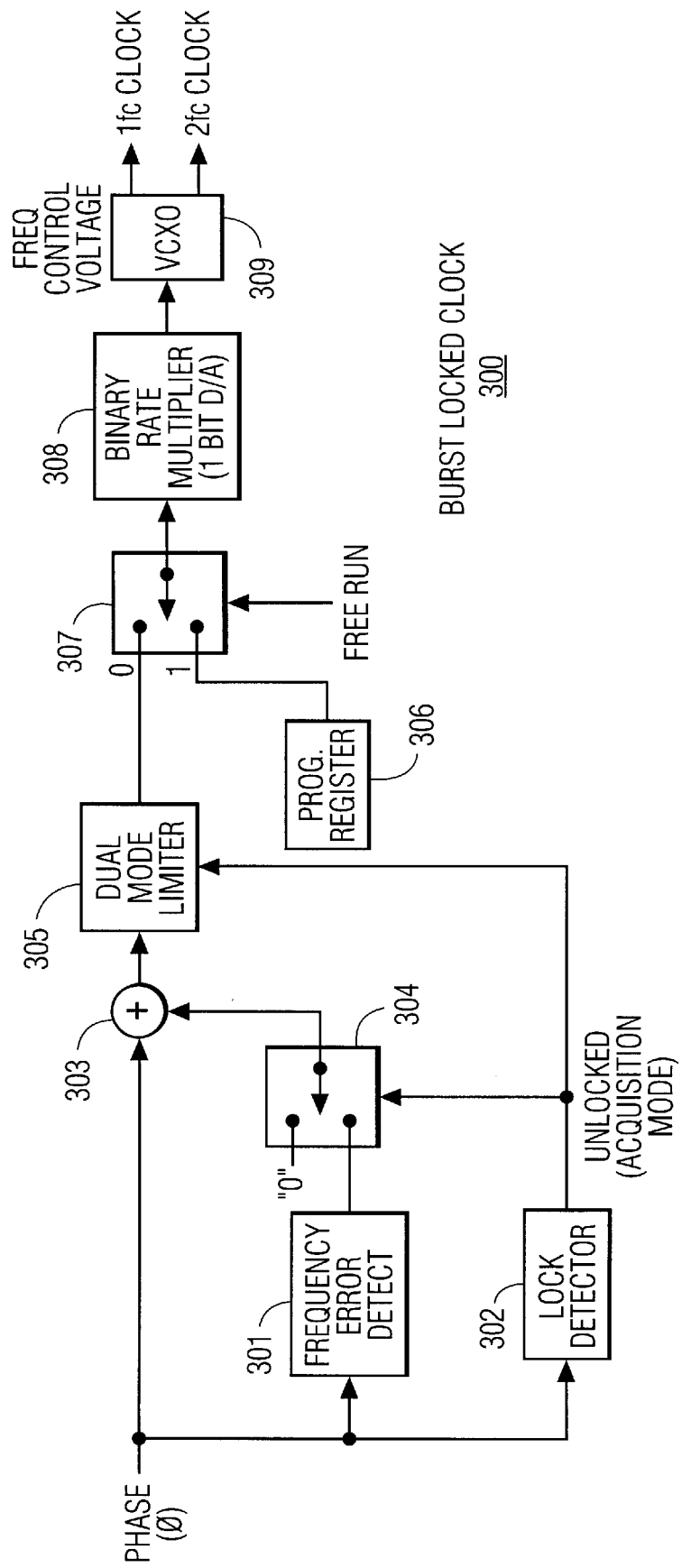
FIG. 3 is a detailed block diagram of a burst locked clock suitable for use in the apparatus of FIG. 2.

The main video signal processing channel of the video processing unit 1000 comprises main selector switch 201, which couples one of the first CV1, second CV2 and third CVS composite video signals to an analog to digital (A/D) converter 207. A/D converter 207 samples the selected main composite video signal at a sampling rate of approximately four times the color subcarrier frequency to produce a video data stream, main video signal CVM. The sampling clock signal 4Fc is phase locked to the color burst reference of the selected main signal by a burst locked clock 300 which is shown in FIG. 3 and which will be described later. The main video signal CVM is coupled to a luma/chroma separator, illustratively comb filter 204, and a b&w detector 250.

B&W detector 250 determines if the main video signal CVM is a color video signal by determining if, e.g., the main video signal CVM includes a color reference (color burst). B&W detector 250 produces an output signal MAIN=B&W indicative of the presence (0) or absence (1) of valid color information in the main video signal CVM.

Comb filter 204 separates main video signal CVM into a main luminance component YM and a main chrominance component CM. The main luminance component YM is converted into an analog luminance component YM' by a digital to analog (D/A) converter 209. In response to a controller (not shown) a switch 290a selectively couples either the main (analog) luminance component YM' or the s-video luminance component SY to overlay switch 206 as a main luminance signal YM".

The main chrominance component CM is coupled to a switch 270, which is responsive to the output signal MAIN=B&W of b&w detector 250. When the output signal MAIN=B&W of detector 250 indicates that the main video signal CVM is a color signal, switch 270 couples the main chrominance component CM of the main video signal CVM to a D/A converter 275. When the output signal MAIN=B&W of b&w detector 250 indicates that the main video signal CVM is not a color signal, switch 270 couples a substitute chroma signal CMS to D/A converter 275. D/A converter 275 converts the selected chrominance signal (CM or CMS) into an analog chrominance signal CM'. A switch 290b selectively couples either the main (analog) chrominance component CM' or the s-video chrominance component SC to overlay switch 206 as a main chrominance signal CM". Switches 290A and 290b are controlled by a controller (not shown).

Substitute chroma signal CMS comprises, e.g., a zero amplitude color signal with a 3.58 MHz color burst reference which is produced by a substitute chroma unit 265. Substitute chroma unit 265 comprises a switch 260 which is responsive to the burst gate BG signal from the timing unit 280. The burst gate signal BG is synchronized to the selected main video signal CVM and is "high" only during the portion corresponding to the "back porch" of each horizontal blanking pulse. The substitute chrominance signal CMS is formed by coupling a substitute burst reference signal (the 1FC clock) to switch 270 during the burst portion of the main video signal and by coupling a substitute color signal (a zero amplitude chrominance value) to switch 270 during the viewable portion of the main video signal.

When b&w detector 250 indicates that the main video signal CVM is not a color signal then the 3.58 MHz color burst of substitute chrominance signal CMS is used by chroma demodulator 218 to demodulate the output chrominance signal CO. It is important to note that a color killer circuit (not shown) within chrominance demodulator 218 will suppress the color information of the received (i.e., CO) signal if color burst is absent. Conversely, the color killer circuit will not suppress the color information if a color burst is present. Therefore, the substitute chrominance signal CMS must also include valid amplitude (color saturation) information. To prevent the display of undesirable color artifacts in the main black and white image the substitute chroma signal CMS has an amplitude of zero during the non-burst (i.e., displayed) portion.

The auxiliary video processing channel of the video processing unit 1000 comprises auxiliary selector switch 203 which couples one of the first CV1, second CV2 and third CVS composite video signals to A/D converter 205. A/D converter 205 samples the selected auxiliary composite video signal at a sampling rate of approximately four times the color subcarrier frequency to produce a video data stream, auxiliary video signal CVA. The auxiliary video signal CVA is coupled to a luma/chroma separator 210 (e.g., a low pass filter and a band pass filter) which separates the selected auxiliary video signal CVA into an auxiliary luminance component YA and an auxiliary chrominance component CA.

Auxiliary chrominance component CA is coupled to a chroma decoder (i.e., demodulator) unit 212, where it is decoded to form color difference vectors (B-Y)A and (R-Y) A. Chroma decoder 212 may be implemented in a standard manner using the color burst reference of auxiliary chrominance component CA. However, the exemplary embodiment of video processing unit 1000 only includes a clock source which is locked to the color burst reference of the main video signal CVM. As such, chrominance decoder 212 operates in an asynchronous manner with respect to the color burst reference of the auxiliary chrominance signal CA. Exemplary circuitry for providing this function is described in U.S. Pat. No. 4,558,348.

Auxiliary luminance component YA and color difference signals (B-Y)A and (R-Y)A are coupled to PIP compress and store unit 214, which compresses the signals YA,(B-Y)A, (R-Y)A using, e.g., a subsampling technique, and stores the compressed signals YA',(B-Y)A',(R-Y)A' in a memory. To produce a PIP image the auxiliary video signal YA,(B-Y)A, (R-Y)A is subjected to both horizontal compression (i.e., reduction in number of picture elements per line) and vertical compression (i.e., reduction in number of lines per field). To produce a side by side (POP) image, the auxiliary video signal YA,(B-Y)A,(R-Y)A may be subjected to compression in one axis only, e.g., horizontal, wherein the POP auxiliary image will retain full resolution in the other axis, e.g., vertical (no missing lines).

The main luminance component YA' is converted into an analog luminance component YA" by a digital to analog (D/A) converter 219. The compressed color difference signals (B-Y)A',(R-Y)A' are coupled to chrominance encoder (i.e., modulator) unit 216, which encodes the signals using the main color burst reference to form a compressed auxiliary chrominance signal CA'.

The compressed auxiliary chrominance signal CA' is coupled to multiplying D/A converter 221, which produces an analog compressed auxiliary chrominance signal CA". The saturation level of the auxiliary chrominance signal CA" is adjusted by varying the gain term PIP C DAC GAIN of the multiplying D/A converter 221.

The auxiliary luma/chroma signal pair YA",CA" is coupled to switch 206 along with (as previously described) the main luma/chroma signal pair YM",CM". Switch 206 is controlled by a controller (not shown) to selectively combine the main YM",CM" and auxiliary YA",CA" luma/chroma signal pairs into an output luma/chroma signal pair YO,CO which, when processed and displayed, will produce the desired PIP or POP effect. Switch 206 may produce a PIP effect on display 222 by coupling the main luma/chroma signal pair YM",CM" to the demodulation 218 and matrix 220 units during the portion of time in which the main image is to be displayed and coupling the auxiliary luma/chroma signal pair YA",CA" to the demodulation 218 and matrix 220 units during the portion of time in which the small (PIP) image is to be displayed.

Demodulation unit 218 demodulates the output chrominance CO signal from video signal processing unit 1000 to produce color difference signals (B-Y)O and (R-Y)O. Luminance output signal YO and color difference output signals (B-Y)O and (R-Y)O are coupled to a matrix and driver unit 220 to produce the RGB signals for display unit 222.

It is important to note that chroma demodulator 218 utilizes the color burst reference of the main luma/chroma signal pair YM",CM" for demodulating the output luma/chroma signal pair YO",CO" of video signal processing unit 1000. If the main luma/chroma signal does not include a color burst (e.g., monochrome video signal) then chroma demodulator 218 will not be able to demodulate the color information contained in the auxiliary luma/chroma signal pair YA",CA". Therefore, without the substitute chroma signal CMS as previously described, the television apparatus 200 of FIG. 2 will not be able to produce a color PIP (or POP) picture with a monochrome main picture.

The invention addresses the above-mentioned problem by detecting if the main picture is monochrome, generating a chroma replacement signal CMS with a burst reference and replacing the main chroma signal with the replacement signal.

Figure 4:
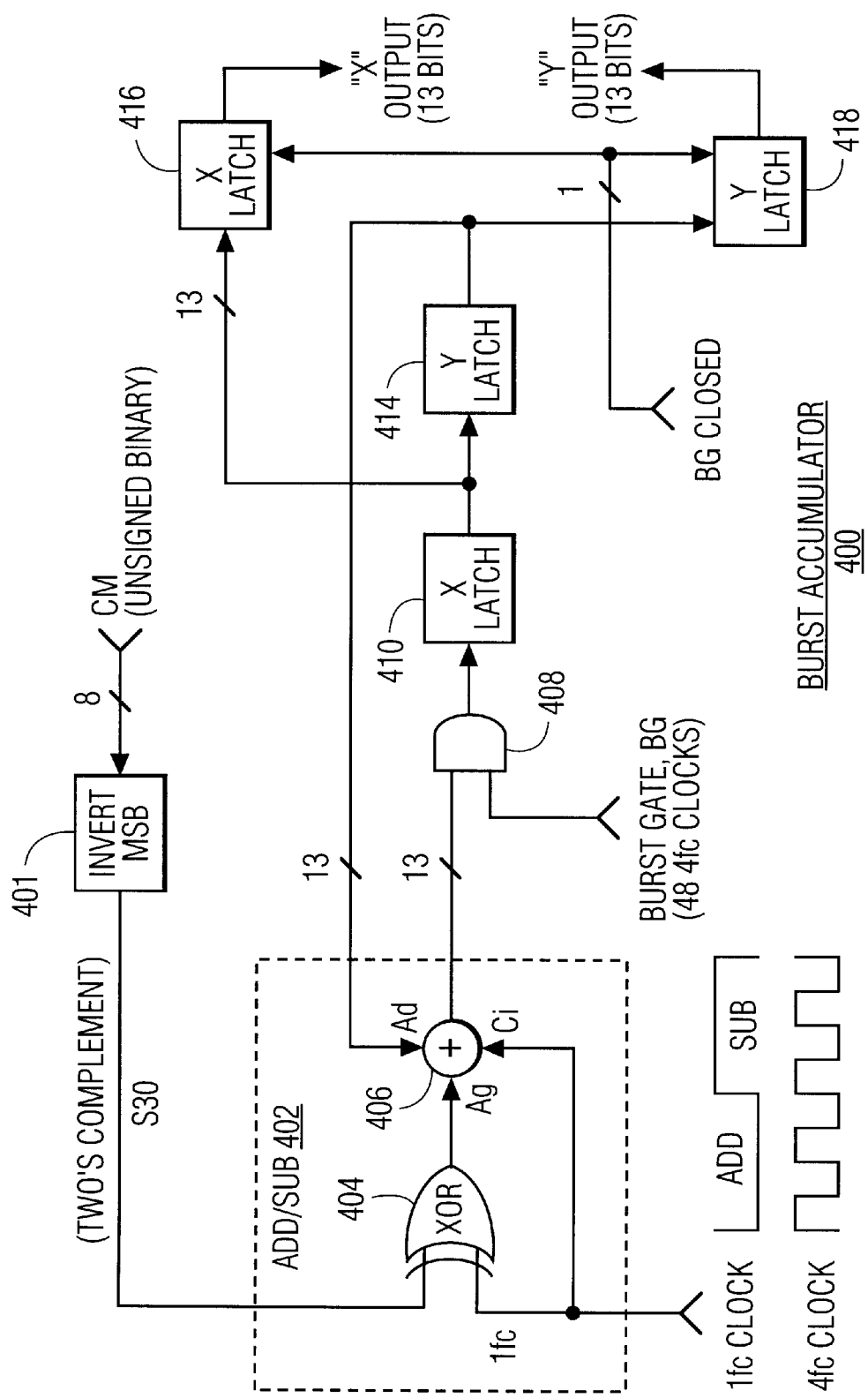
FIG. 4 is a detailed block diagram of a burst sample accumulator suitable for use in the apparatus of FIG. 2.

Referring to FIG. 2, b&w detector 250 will now be explained in detail. B&W detector 250 receives chrominance component CM of the main video signal CVM from comb filter 204, determines if the main video signal CVM is a color video signal and produces an output signal MAIN= B&W indicative of whether or not the main video signal CVM is black and white. B&W detector 250 includes a burst accumulator (or "quadrature phase detector") 400, which sorts and totalizes the even and odd polarity corrected samples of the main chrominance signal CM occurring during the burst interval into a first group of samples X (which occur at the burst peaks) and a quadrature group of samples Y (which occur at the burst zero crossings). The numbers X and Y represent the burst vector coordinates in a Cartesian (rectangular) coordinate system. An exemplary accumulator is shown in FIG. 4 and described later.

Figure 5:
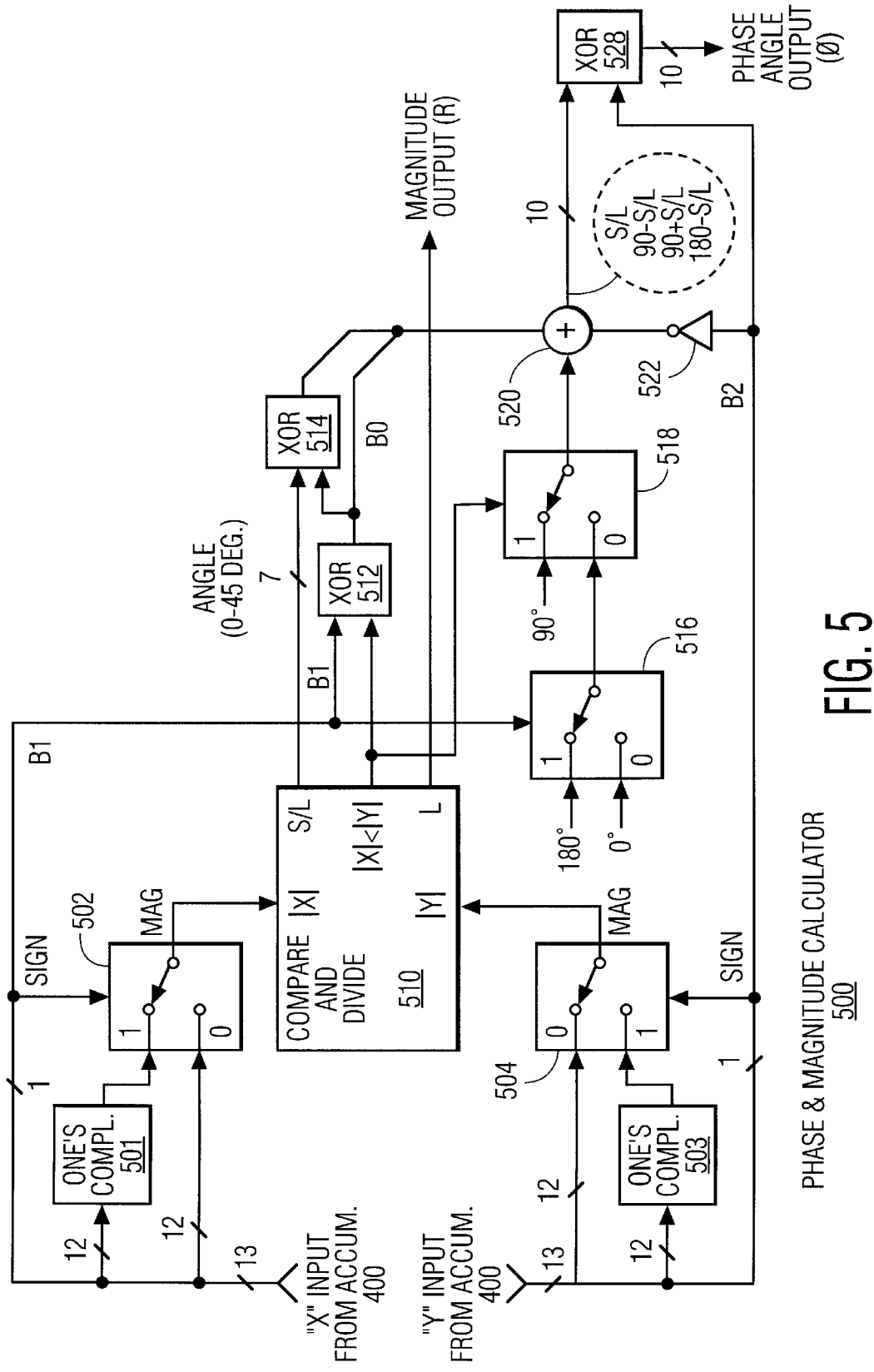
FIG. 5 is a detailed block diagram of a phase and magnitude calculator suitable for use in the apparatus of FIG. 2.

The X and Y coordinates of the burst vector are next applied to phase and magnitude calculator 500 (a rectangular to polar coordinate converter) which converts the XY coordinates from rectangular to polar coordinate form (R,Ø) having a magnitude term R and a phase angle term Ø. One approach to providing this conversion would be to apply the X and Y values to the address inputs of a read only memory (ROM) programmed with corresponding radius and angle values. Such an arrangement, however, would require a relatively large memory. An approach used in the exemplary embodiment eliminates the need for large memory by calculating the angles using sine, cosine or tangent trigonometric approximations. FIG. 5 is exemplary of such a coordinate system converter (rectangular to polar) and is discussed in detail later.

The magnitude term R is coupled to a filter 215, which provides a filtered magnitude term Ravg at an output. The filter 215 improves system performance by reducing errors caused by spurious or erroneous magnitude terms by recursively filtering the magnitude term R, thus providing a rolling average Ravg of the most recent magnitude terms. A suitable implementation of filter 215 would be, e.g., a recursive filter providing a rolling average of the eight most recent magnitude terms.

The filtered magnitude term Ravg is then coupled to an input B of a digital comparator 213. A threshold level signal provided by a "NO BURST" threshold level signal source 211 is coupled to an input A of the digital comparator 213. Comparator 213 produces a substantially bi-level output signal MAIN=B&W which will be set to a "low" (i.e., "0") level if the signal at input B (Ravg) is greater than the signal at input A (threshold). The threshold level, which may be adjustable, represents a minimum magnitude level of a valid color burst. If the magnitude of Ravg is less than the magnitude of the threshold level, then the output of comparator 213 will produce a "high" output signal MAIN=B&W indicating that the main video signal CVM is not a color signal. A "low" output signal indicates that the main video signal CVM is a color signal.

A correct auxiliary image saturation level (i.e., pale to vivid) may be produced by adjusting the auxiliary saturation level in accordance with the main burst amplitude. In the exemplary embodiment this is accomplished by feeding the main burst level (Ravg) to the multiplying D/A converter 221 as gain term PIP C DAC GAIN.

When the main video signal CVM is a color video signal, a switch 217 couples the filtered magnitude term Ravg to D/A converter 221 as the gain reference signal PIP C DAC GAIN. When the main video signal CVM is not a color video signal, switch 217 couples a substitute (fixed or adjustable) magnitude term AUX SAT LEVEL (a level corresponding to, e.g., a 40 IRE burst) to D/A converter 221 as the gain reference signal PIP C DAC GAIN. The substitute magnitude term is selected to produce a saturation level in the color auxiliary image which is similar to the nominal saturation level in the main image if the main image was a color image.

FIG. 3 shows an exemplary embodiment of burst locked clock 300. The purpose of the burst locked clock is to produce two output clock signals which are locked to the color burst reference of the main video signal CVM in a first (locked) operating mode.

The first signal 1Fc has a frequency equal to the main color burst (subcarrier) frequency, approximately 3.58 MHz. The second signal 4 Fc has a frequency equal to four times the main color burst (subcarrier) frequency, approximately 14.32 MHz. These two clock signals are used throughout video signal processing unit 1000 for, e.g., timing and sampling purposes. If there is no main color burst reference (i.e., main video is black and white) then the burst locked clock operates in a second (unlocked or "free run") mode. In the second mode the 1Fc clock is set to a nominal 3.58 MHz frequency. The 4Fc clock signal is still an accurate multiple of four times the 1 Fc clock signal.

Burst locked clock 300 receives the phase angle term Ø produced by phase and magnitude calculator 500. This term Ø is applied to an adder 303, to a frequency error detector 301 and to a lock detector 302. The output of the lock detector 302 is applied to a switch 304 that couples the frequency error output of detector 301 to another input of adder 303 when the lock detector indicates that the system is not locked. The frequency error detector measures the rate of change of the phase signal Ø from line to line and is, essentially, a differentiator and may be implemented by storing the phase of a previous line in a latch and subtracting the current and previous phase values to obtain the derivative with respect to time.

Since the derivative of phase with respect to time equals frequency, the output of the frequency error detector is proportional to the frequency error when the system is not locked. In this out-of-lock condition, the lock detector 302 enables switch 304 to add the frequency error signal to the phase angle signal Ø in adder 303. This "augmentation" of the phase angle signal when the loop is out of lock has been found to desirably enhance the speed of phase locking. Once locked however, lock detector 302 opens switch 304 removing the frequency error signal from adder 303 and thereafter phase control is solely by means of the phase angle signal Ø.

The output of adder 303, as noted above, comprises the burst phase angle signal Ø when the system is locked (switch 304 open) and comprises the sum of burst phase angle signal Ø and the frequency error signal when the system is out of lock. The adder output signal is applied to a limiter circuit 305 which provides limiting as described below. The limited signal is applied to a binary rate multiplier 308.

The purpose of the binary rate multiplier 308 is to generate pulses of current for charging and discharging a capacitor in a loop filter (not shown) within voltage controlled crystal oscillator (VCXO) 309 and thereby control the frequency of oscillation of the VCXO 309. The number or rate of production of current pulses is proportional to the phase angle signal Ø. In response to the magnitude of the phase angle signal Ø, binary rate multiplier 308 generates positive current pulses for charging the loop capacitor and increasing the VCO frequency or negative current pulses for discharging the loop capacitor and decreasing the VCO frequency. At lock the magnitude of the phase angle signal Ø approaches zero and only enough pulses are produced to maintain a locked condition.

The reason for limiting the phase angle signal Ø in limiter 305 is to prevent large phase or frequency errors from overly influencing the loop operation. When the system is locked and the burst phase angle is greater than a predetermined minimum or limiting value, it is desirable to limit the magnitude of the burst phase angle signal Ø in order to limit the maximum charge or discharge currents applied to the loop capacitor in VCXO 309. An exemplary "limiting" value when the system is locked is a phase angle of about 3.5 degrees. When out of lock, the limiting level is increased (by a factor of ten or more) to enhance the speed of re35 acquiring lock.

As previously noted, if the main video signal CVM is a black and white (monochrome) signal (i.e., having no burst signal to lock onto), then the burst locked clock will operate in the second, or unlocked mode. Switch 307 receives a signal FREE RUN which corresponds to the output signal MAIN=B&W of comparator 213. In response to this signal, switch 307 will couple, illustratively, the contents of a programmable register 306 to the binary rate multiplier 308. Binary rate multiplier 308 will in turn cause the VCXO to operate at a fixed frequency. The data stored in the register 306 is calculated (or determined empirically) to be that data which will produce nominally correct output clock frequencies 1Fc and 4Fc.

FIG. 4 is a detailed logic diagram of a suitable implementation of the burst accumulator (or quadrature phase detector) 400 of FIG. 2. Reviewing briefly, the function of the accumulator is to sample burst at four times the color subcarrier frequency (4Fc) thus producing one sample for each 90 degrees of the burst signal. When the loop is locked, the even samples occur at the peaks of the burst thus forming the "in-phase" or "X" samples and the odd samples occur at axis crossings of burst to form the "quadrature phase" or "Y" samples. Taken together, these two values, X and Y represent the burst vector in a rectangular coordinate system. The function of the accumulator 400 is to perform the necessary arithmetic operations for properly sorting and totaling the samples including removal of the direct current (DC) component or "pedestal" value (e.g., around black level) from the burst samples produced by the A/D converter 207.

In more detail, the video signal samples CVM produced by A/D converter 207 are in the form of unsigned binary. Since burst appears during the trailing portion of horizontal sync, it will have a DC or pedestal value around black level. The exact value may be unknown or may vary with the signal source. To remove this component from the burst measurements, the video signal CVM from A/D converter 207 is first converted from unsigned binary to a two's complement form by inverting the most significant bit (MSB) by means of an inverter 401. This change in arithmetic form facilitates addition and subtraction of samples in the accumulator.

The two's complement samples from the inverter 401 are next applied to an adder/subtractor 402 comprising an exclusive OR gate 404 and a full adder 406. Selection of addition or subtraction modes is controlled by the clock signal 1Fc which is at the color subcarrier frequency (one fourth of the 4Fc clock rate of VCXO 309). The adder/subtractor output is stored in two series connected latches 410 and 414 and fed back to the adder addend input. By clocking the latches at the 4Fc sample rate and changing from addition to subtraction every two sample periods using the 1Fc clock, the in-phase samples "X" will be accumulated in latch 410 and the quadrature phase samples "Y" will be accumulated in latch 414. Since the adder/subtractor alternates between addition and subtraction every two sample periods of the 4Fc clock, the "X" samples are alternately added and subtracted to produce the accumulated "X" value in latch 410. It is the alternate addition and subtraction of the X value samples (e.g., +X0, −X2, +X4, −X6, +X8, −X10 etc.) which results in cancellation of the DC component of X. The burst component of X does not cancel because the burst "sign" or polarity alternates every two samples and so the burst samples add. Accordingly, the burst samples accumulate and the DC component or pedestal portion of the samples simply cancel. The same result occurs for the Y samples.

To confine the X and Y samples to burst only, the output of adder 406 (a 13 bit sum) is applied to the accumulator latch 410 via a burst gate 408 which is enabled for 48 of the 4Fc clock periods during the burst interval of each line. A typical burst (NTSC) will have 8 complete cycles corresponding to 32 samples of the 4-Fc clock. The burst gate is intentionally made substantially wider than the burst width to ensure capture of all the burst cycles in the event of substantial timing errors in the video source.

At the end of the burst gating period (48 samples of the 4Fc clock) a burst gate closed signal (provided by timing unit 280) is applied to latches 416 and 418 which store the accumulated burst vector data X and Y for the remainder of the line during which time the data is converted to polar form by phase and magnitude calculator 500, the magnitude term is filtered by filter 215 and compared to a threshold level by comparator 213 to produce the output signal MAIN=B&W indicating if the main video signal is monochromatic or color, as previously explained.

FIG. 5 is a detailed logic diagram illustrating the phase and magnitude calculator 500 which converts the rectangular X and Y burst coordinates to polar coordinate form (magnitude and angle). To provide polar conversion, the X and Y coordinates from burst accumulator 400 are applied to respective inputs of a comparison and division circuit 510 via respective one's complementor circuits each comprising a ones complementor or inverter (501 or 503) and a multiplex switch (502 or 504) controlled by the sign bit of the input signal. This converts the coordinates from two's complement to unsigned binary for ease of subsequent magnitude comparisons and division. For example, when the sign of X is "0" (bit 13, indicating a positive number), the remaining 12 bits of the magnitude of X are passed directly to the X input of circuit 510 via mux 502. If, however, the sign of X is negative (binary "1", indicating a negative number), then mux switch 502 couples the complemented 12 magnitude bits to the X input of circuit 510 thus converting X to unsigned binary form. The magnitude bits (e.g., 1–12) of the Y input signal are similarly converted to unsigned form under control of the Y sign bit (bit 13) for application to the Y input of the comparison and division circuit 510. Internally, the compare and divide circuit 510 includes a magnitude comparator for identifying the larger of X and Y and outputs this value as signal "L" (i.e., "larger"). The signal "L" is used to represent the "MAGNITUDE" of the polar burst vector for application to the burst level comparator 213.

Considering now the details of the polar conversion function of phase and magnitude calculator 500, this conversion is based on an approximation that for small angles (e.g., below 45 degrees) the arctangent of the angle defined by the rectangular coordinates X and Y is approximately equal to the smaller of X and Y divided by the larger of X and Y. Compare and divide circuit 510 includes a magnitude detector, as previously explained, which determines the relative sizes of X and Y. This detector is used internally to perform a division of the smaller of the larger signal (signified as "S/L") and this number is used to represent the 7 least significant bits of the polar angle which cover a range of 45 degrees (one octant). To cover a full circle (360 degrees) the calculator 500 adds or subtracts angles of 0, 90, or 180 degrees depending upon the octant according to the following Table 1 (below).

Identification of specific octants of the burst vector is provided by a three bit octant identification signal. The most significant bit B2 comprises the sign bit of the "Y" input signal. The second most significant bit B1 comprises the sign bit of the "X"input signal. The least significant bit B0 comprises the exclusive OR (via XOR 512) of the sign bit of the "X" input signal with the output of the X<Y magnitude comparator in circuit 510. Table 1 (below) identifies the octants 0–7 in terms of this three bit code.

TABLE 1

| oct | bin | angle | oct | bin | angle |
|---|---|---|---|---|---|
| 0 | 000 | S/L | 4 | 100 | − (S/L) |
| 1 | 001 | 90 − S/L | 5 | 101 | − (90 − S/L) |
| 2 | 010 | 90 + S/L | 6 | 110 | − (90 + S/L) |
| 3 | 011 | 180 − S/L | 7 | 111 | − (180 − S/L) |

In more detail, the arithmetic calculations of the burst vector angle are performed in calculator 500 by a full adder 520 which by means of exclusive OR gate 514 and inverter 522 is capable of either addition or subtraction. Two multiplex switches are provided 516 and 518 which provide the numerical equivalent of fixed angles of 0, 90 and 180 degrees to one input of the adder 420. By selecting the appropriate fixed angle, and arithmetically combining (e.g., adding or subtracting) it with the arctangent approximation of the burst angle (the signal S/L), any burst angle in octants 0–3 can be represented. The remaining octants 4–7 are calculated by inverting the corresponding one of the octants 0-3. This is done by the exclusive OR gate 528 connected to the output of adder 420.

As an example of calculation of the burst angle, assume that the vectors X and Y are both positive and X is larger than Y. This defines a burst vector in octant "0" which lies between zero and forty five degrees and whose angular value is approximately equal to Y/X (the smaller divided by the larger). Since X is positive, the multiplex switch 516 will select the constant "zero" as an output which corresponds to zero angular degrees. Since it is assumed that X is larger than Y the comparator signal X<Y will also be zero thus causing multiplex switch 518 to select the output of switch 516 which is zero degrees, as previously noted. Adder 522, for this condition adds a constant of zero (from switches 516 and 518) to the arctangent approximation (S/L) from compare and divide circuit 510 and since the sign of Y is zero (Y is positive) the output exclusive OR gate 528 will pass this value (+S/L) as the burst phase angle Ø.

For different octants, adder 520 adds different constants to S/L as shown in the inset dashed circle at the adder output and shown also in the above Table 1. For example, for a burst vector lying in octant 1, the complete vector angle is the value of S/L subtracted from the 90 degree reference provided by switch 516.

In octant 2 the 90 degree value is added to the S/L value and in octant 3 the burst vector is determined by subtracting the S/L value from 180 degrees. For the remaining octants 4–7, the value of the burst vector is found exactly as for the corresponding octants 0-3 except that the output of the adder 520 is inverted by exclusive OR gate 528 thus reversing the sign of the indicated burst phase angle.

Referring now to FIG. 2, the magnitude term R produced by phase and magnitude calculator 500 is coupled to threshold comparator 213 via filter 215 (e.g., a recursive filter). The filtered magnitude term Ravg is compared to a threshold level signal provided by a "NO BURST" threshold level signal source 211. For purposes of overall system adjustment, the threshold source 211 is programmable to provide a number of reference values. Illustratively, burst reference values of 16, 32, 64 and 128 are available. In terms of IRE signal levels, these correspond to burst amplitudes of 1, 2, 4 and 8 IRE levels. The comparator 213 compares signal Ravg (which equates to the "larger" of the vector components X and Y measured by phase and magnitude calculator 500), with the burst reference level provided by threshold level source 211 and outputs the MAIN=B&W signal when the magnitude signal "L" is less than the burst threshold level signal. The time constant of this burst detector may be relatively long (e.g., at a field rate rather than at a line rate).

As previously mentioned, switch 290a selectively couples either the main (analog) luminance component YM' or the s-video luminance component SY to overlay switch 206 as a main luminance signal YM". Similarly, switch 290b selectively couples either the main (analog) chrominance component CM' or the s-video chrominance component SC to overlay switch 206 as a main chrominance signal CM". Both switches are responsive to a controller (not shown).

The inventors recognize that if the main image of the picture to be displayed is derived from the video information contained in the s-video signals, then it is desirable to couple the s-video signals directly to the overlay switch (rather than using a comb separated version of the combined s-video signals). However, since the auxiliary video signal resolution is dramatically reduced by, e.g., subsampling in the PIP compress and store unit 214, the average viewer would not discern any substantial difference between an s-video auxiliary image and a composite video version of the combined s-video auxiliary image. Thus, video processing unit 1000 does not include a similar switching capability for the auxiliary channel.

The operation of switch 290a depends only upon whether or not the s-video input is selected for processing by the main processing channel. If the s-video signal is selected for processing by the main processing channel, even if the s-video signal is a black and white signal, then switch 290a will couple the s-video luminance signal to the overlay switch 206.

The operation of switch 290b depends upon whether or not the s-video input is selected for processing by the main processing channel and whether or not the s-video signal is a color signal. If the s-video input is not selected for processing by the main processing channel then the main channel will process the selected video input (i.e., CV1 or CV2) in the manner previously described. If the s-video signal is selected for processing by the auxiliary processing channel, then the composite signal CVS will be processed by the auxiliary processing channel in the manner as previously described. If the s-video signal is selected for processing by the main processing channel and the s-video signal is a color signal, then switches 290a and 290b will couple the s-video luminance signal SY and chrominance signal SC, respectively, to the overlay switch 206. However, if the selected s-video signal is a black and white signal then switch 290b will couple the chrominance signal CM' to overlay switch 206. This is because the black and white s-video signal does not contain the necessary color information which would allow chrominance demodulator 218 to demodulate a color auxiliary signal. Therefore, the conventional video signal CVS produced by summing amplifier 227 (which in this case is black and white) will be processed by the main channel, which will sense that the signal is black and white and responsively couple a substitute chrominance signal to switch 290b.

The exemplary embodiment utilizes a black and white (b&w) detector 250 which includes a burst locked clock (BLC) 300. However, it must be noted that the BLC 300 does not need to be part of b&w detector 250. The BLC 300 is included within the b&w detector 250 because the inventors recognized that it was possible to construct a b&w detector using circuitry common to a BLC, namely a burst accumulator, a phase and magnitude calculator and a burst level detector. By combining these common elements together the inventors were able to achieve certain synergistic effects, e.g., reducing circuitry cost and complexity while increasing circuit reliability.

The above-described combination of the BLC and b&w detector is not readily apparent because the BLC must be modified to accommodate such an arrangement. For example, the BLC depends upon the phase component output of the phase and magnitude calculator to operate properly. In the absence of this phase component (i.e., when the main signal is a black and white signal) the BLC will not operate properly. The solution in this embodiment was the "freerun" mode described previously with respect to the BLC of FIG. 3.

It will be apparent to those skilled in the art, that although the invention has been described in terms of specific examples, modifications and changes may be made to the disclosed embodiments without departing from the essence of the invention. It is, therefore, to be understood, that the appended claims are intended to cover all modifications which naturally flow from the foregoing description and examples.

Note that while the invention has been described in terms of a system in which the auxiliary signal processing operations (e.g., for size reduction in a PIP system) utilize luminance and chrominance components, the invention is also applicable in systems in which the auxiliary signal processing operations utilize a composite video signal containing both luminance and chrominance components in a single signal.

We claim:

1. Apparatus comprising:

means for combining a first video signal and a second video signal to provide an output video signal suitable for coupling to a display device for producing an image comprising a first portion representative of said first video signal and a second portion representative of said second video signal;

a detector for detecting when said first video signal includes less than a predetermined level of chrominance information;

means for generating a substitute chroma signal; and means coupled to said detector for including said substitute chroma signal in said first video signal in response to said first video signal including less than said predetermined level of chrominance information.

2. The apparatus of claim 1, wherein said detector further comprises:

means for determining a phase and magnitude (R) of a subcarrier reference component of said first video signal; and means coupled to said determining means for comparing said magnitude of said subcarrier reference component to a predetermined threshold level and producing a signal indicative of said comparison.

3. The apparatus of claim 1, further comprising:

means for producing a first clock signal substantially locked to a subcarrier reference component of said first video signal, and for producing a second clock signal having a frequency substantially equal to a multiple of the frequency of said first clock signal.

4. The apparatus of claim 2, wherein said detector further comprises:

means coupled to said determining means for producing a first clock signal substantially locked to said subcarrier reference component of said first video signal, and for producing a second clock signal having a frequency substantially equal to a multiple of the frequency of said first clock signal.

5. The apparatus of claim 1, wherein said substitute chroma signal comprises a subcarrier reference component and a viewable component, said viewable component comprising a substantially zero amplitude level.

6. In a television system, apparatus to provide an output video signal suitable for coupling to a display device for producing an image comprising a main portion representative of a main video signal and an auxiliary portion representative of an auxiliary video signal, apparatus comprising:

means for processing said main an auxiliary video signals to produce respective main and auxiliary video images, said processing means including means susceptible to disabling a color image component from said auxiliary video signal when said main video signal does not have a color image component;

means for generating a replacement color image component for said main video signal;

means for including said replacement color image component within said main video signal when said main video signal does not have said color image component.

7. The television system of claim 6, wherein said means for including said replacement color image component within said main video signal comprises:

means for determining if said main video signal is a color video signal, said determining means producing a control signal indicative of the presence of color information in said main video signal.

8. The television system of claim 6, wherein said replacement color image component comprises a subcarrier reference component and a viewable component, said viewable component comprising a substantially zero amplitude level.

9. In a television system capable of displaying a main video image responsive to a main video signal and an auxiliary video image responsive to an auxiliary video signal, apparatus comprising:

means for processing said video signals to produce said main and auxiliary video images, said processing means susceptible to disabling said color image component from said auxiliary video signal when said main video signal does not have a color image component;

means for generating a replacement color image component for said main video signal;

means for including said replacement color image component within said main video signal when said main video signal does not have a color image component.

10. Apparatus comprising:

means for processing a first video signal and a second video signal for producing an output video information signal, said first video signal having at least a luminance component, said second video signal having a luminance component and a chrominance component;

said processing means including means for combining said first and second video signals such that said output video signal, when displayed on a video image display device, produces a main image comprising information from said first video signal and a secondary image comprising information from said second video signal;

said processing means further comprising:

means responsive to said chrominance component of said first video signal for determining whether said first video signal exhibits less than a predetermined level of chroma information;

means coupled to said determining means for generating a replacement chrominance component for said first video signal and including said replacement chrominance component within said first video signal when said first video signal exhibits less than said predetermined level of chroma information.

11. Apparatus comprising:

means for processing a plurality of input video signals having information components to produce an output video signal, said processing means being responsive to a timing signal for combining the information components of one or more of said input video signals;

means for determining if a first of said plurality of input video signals exhibits less than a predetermined level of chroma information;

means for generating a chroma signal with burst; and means responsive to said determining means for coupling said chroma signal with burst to said processing means when said first of said plurality of input video signals exhibits less than said predetermined level of chroma information.

* * * * *